US009901867B2

(12) United States Patent
Roussin-Bouchard et al.

(10) Patent No.: US 9,901,867 B2
(45) Date of Patent: Feb. 27, 2018

(54) AIR-SEPARATION DEVICE, INERTING DEVICE AND AIRCRAFT COMPRISING SUCH A DEVICE

(71) Applicant: L'Air Liquide, Societe Anonyme pour l'Etude et l'Exploitation des Procedes George Claude, Paris (FR)

(72) Inventors: Xavier Roussin-Bouchard, Meaudre (FR); Aurelie Caillaud, Voiron (FR); Pierre Gianese, Le Touvet (FR); Elodie Dumont, Vourey (FR); Jean-Marc Dejonghe, Allex (FR)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 96 days.

(21) Appl. No.: 15/028,250

(22) PCT Filed: Sep. 15, 2014

(86) PCT No.: PCT/FR2014/052285
§ 371 (c)(1),
(2) Date: Apr. 8, 2016

(87) PCT Pub. No.: WO2015/052392
PCT Pub. Date: Apr. 16, 2015

(65) Prior Publication Data
US 2016/0243496 A1     Aug. 25, 2016

(30) Foreign Application Priority Data
Oct. 9, 2013   (FR) ...................................... 13 59769

(51) Int. Cl.
*B01D 53/22* (2006.01)
*B01D 63/02* (2006.01)
(Continued)

(52) U.S. Cl.
CPC .......... *B01D 53/228* (2013.01); *B01D 53/22* (2013.01); *B01D 63/02* (2013.01); *B01D 63/021* (2013.01);
(Continued)

(58) Field of Classification Search
CPC .............. B01D 63/021; B01D 2313/23; B01D 2313/56; B01D 2259/4575;
(Continued)

(56) References Cited

U.S. PATENT DOCUMENTS 3,339,341 A * 9/1967 Murdock ............... B01D 63/02
                                                95/53
3,507,097 A * 4/1970 Crowley ............ B01D 53/0438
                                         137/625.69
(Continued)

FOREIGN PATENT DOCUMENTS

EP          1 810 740        7/2007
WO      WO 03/014025     2/2003

OTHER PUBLICATIONS

International Search Report and Written Opinion for PCT/FR2014/052285, dated Dec. 23, 2014.
(Continued)

*Primary Examiner* — Anthony Shumate
(74) *Attorney, Agent, or Firm* — Christopher J. Cronin

(57) ABSTRACT

The invention relates to an air-separation device comprising a generally cylindrical casing housing a filtration element including a bundle of hollow oblong fibers forming a membrane, the longitudinal axis of the fibers being parallel to the longitudinal axis (A) of the cylindrical casing, said
(Continued)

casing comprising an air inlet at a first end and an outlet for purified gas at a second end. The device comprises a member for maintaining the fiber bundle in the casing, characterized in that the maintenance member comprises at least one spring member disposed inside the casing, said spring member being loaded between an end-stop formed by the casing and a longitudinal end of the fiber bundle in order to maintain the fiber bundle longitudinally in place while allowing it to dilate and contract.

12 Claims, 1 Drawing Sheet

(51) Int. Cl.
 B01D 67/00 (2006.01)
 B64D 37/32 (2006.01)
(52) U.S. Cl.
 CPC ......... B01D 67/0097 (2013.01); B64D 37/32 (2013.01); *B01D 2053/224* (2013.01); *B01D 2256/10* (2013.01); *B01D 2257/104* (2013.01); *B01D 2258/06* (2013.01); *B01D 2259/4575* (2013.01); *B01D 2313/02* (2013.01); *B01D 2313/23* (2013.01); *B01D 2313/56* (2013.01)
(58) Field of Classification Search
 CPC B01D 2256/10; B01D 2313/02; B01D 63/02; B01D 53/228; B01D 2258/06; B01D 2257/104; B01D 53/22; B01D 37/32; B01D 2053/224; B01D 67/0097
 See application file for complete search history.

(56) References Cited

U.S. PATENT DOCUMENTS

| | | | | |
|---|---|---|---|---|
| 3,615,016 A | | 10/1971 | Soriente et al. | |
| 4,207,084 A | * | 6/1980 | Gardner | B01D 53/0407 96/113 |
| 4,308,654 A | * | 1/1982 | Bogart | B01D 53/22 210/321.89 |
| 4,781,889 A | * | 11/1988 | Fukasawa | B01D 61/38 128/DIG. 3 |
| 5,160,615 A | * | 11/1992 | Takagi | B01D 61/30 210/321.8 |
| 5,484,528 A | | 1/1996 | Yagi et al. | |
| 5,595,586 A | * | 1/1997 | Sivavec | B01D 53/0462 95/143 |
| 5,914,154 A | * | 6/1999 | Nemser | A61L 9/16 427/235 |
| 6,004,511 A | * | 12/1999 | Biscegli | A61M 1/1698 422/44 |
| 6,217,635 B1 | * | 4/2001 | Conrad | B01D 53/0446 95/105 |
| 7,717,983 B2 | | 5/2010 | Semmere et al. | |
| 2002/0158167 A1 | | 10/2002 | Schmutz et al. | |
| 2003/0010205 A1 | * | 1/2003 | Bikson | B01D 46/003 95/52 |
| 2005/0035041 A1 | * | 2/2005 | Nohren, Jr. | A45F 3/16 210/209 |
| 2005/0230856 A1 | * | 10/2005 | Parekh | B01D 19/0031 261/122.1 |
| 2006/0037896 A1 | * | 2/2006 | Cote | B01D 63/02 210/150 |
| 2007/0274845 A1 | * | 11/2007 | Ruprecht | B01D 53/053 417/390 |
| 2009/0078115 A1 | * | 3/2009 | Mori | A63B 39/027 95/19 |
| 2010/0018394 A1 | * | 1/2010 | Ekiner | B01D 53/228 95/54 |
| 2010/0269342 A1 | * | 10/2010 | Carpenter | A61M 1/1698 29/890.03 |
| 2010/0326278 A1 | | 12/2010 | Nakamura et al. | |
| 2011/0062074 A1 | * | 3/2011 | Ishibashi | B01D 61/18 210/321.87 |
| 2011/0232484 A1 | * | 9/2011 | Yoshinaga | B01D 53/228 95/47 |
| 2017/0216764 A1 | * | 8/2017 | Garfinkle | B01D 53/22 95/47 |

OTHER PUBLICATIONS

French Search Report and Written Opinion for FR1359769, dated Jun. 4, 2014.

* cited by examiner

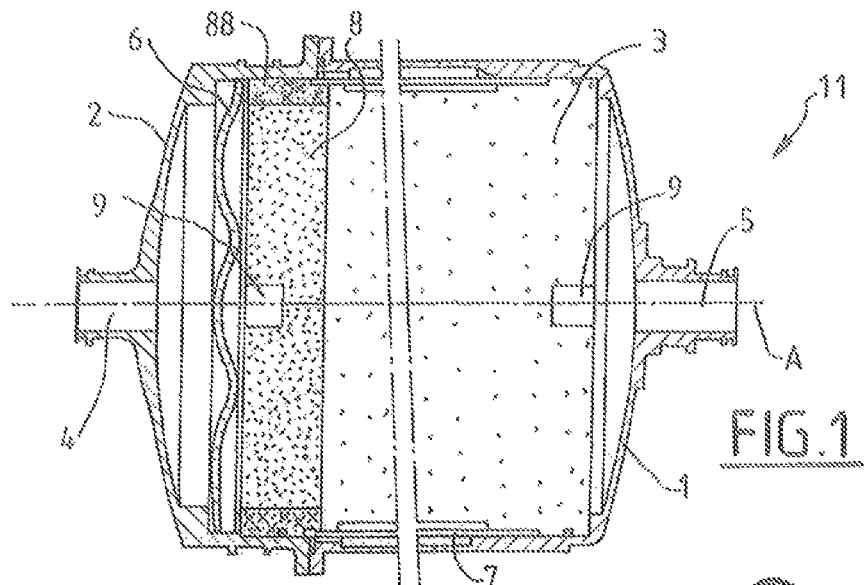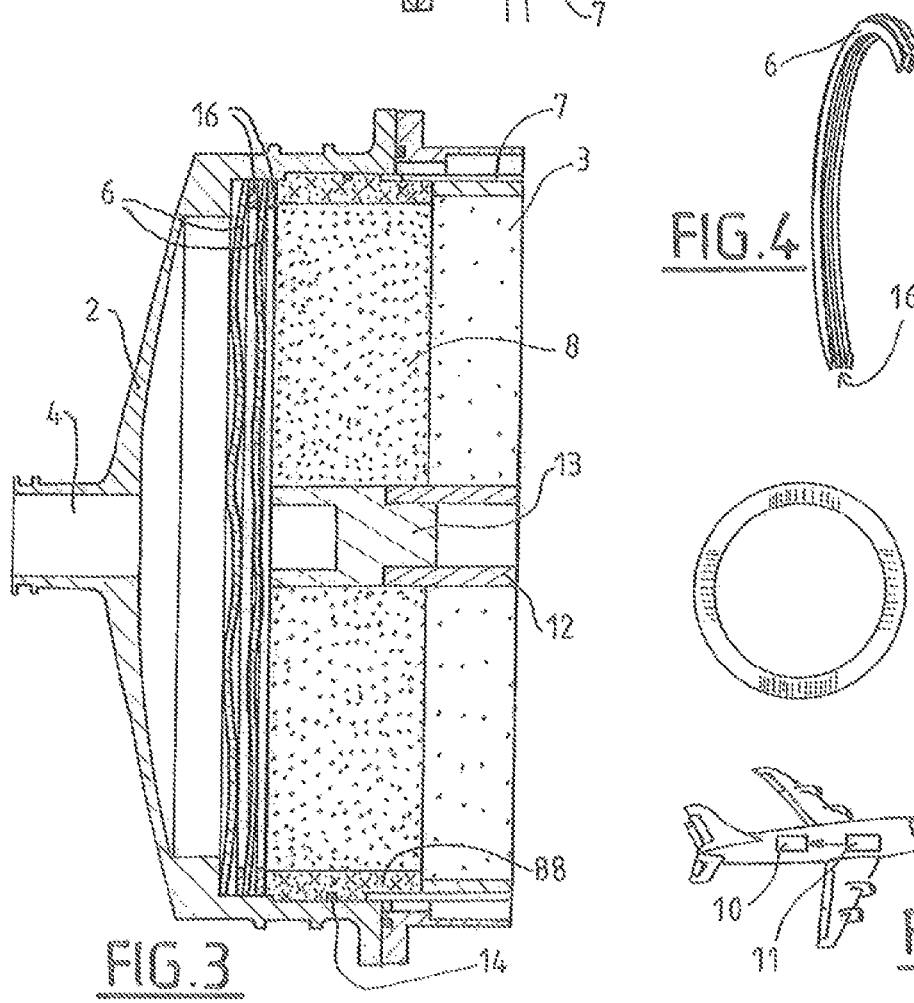

AIR-SEPARATION DEVICE, INERTING DEVICE AND AIRCRAFT COMPRISING SUCH A DEVICE

CROSS-REFERENCE TO RELATED APPLICATIONS

This application is a §371 of International PCT Application PCT/FR2014/052285, filed Sep. 15, 2014, which claims §119(a) foreign priority to French patent application FR1359769, filed Oct. 9, 2013.

BACKGROUND

Field of the Invention

The present invention relates to an air separation device, as well as to an inerting device and an aircraft comprising such a device.

The invention relates more particularly to an air separation device comprising a casing with a generally cylindrical form which accommodates a filtration element comprising a bundle of hollow oblong fibers forming a membrane, the longitudinal axis of the fibers being parallel to the longitudinal axis of the cylindrical casing, the casing comprising at a first end an air inlet orifice, and, at a second end, a purified gas outlet orifice, the device comprising a unit for retention of fibers in the casing.

Related Art

The filtration of the gases from the air by means of a hollow fiber membrane is a process commonly used in industry, and in particular in the aeronautics field. This technology consists of collecting air obtained from a compressor/compressors or an engine/engines and making it circulate in a separation system containing a selective porous membrane which permits "passage" of only the molecules of one chemical type (oxygen for example). By compartmentalizing this system in a sealed manner, it is possible to recuperate at the outlet firstly oxygen-reduced air, which is therefore very rich in nitrogen, and secondly oxygen-enriched air. The nitrogen-enriched air can be used to inert fuel tanks for example, whereas the oxygen-enriched air can be simply discharged into the atmosphere.

The air separation systems generally comprise a casing comprising a metal cylinder (known as the envelope) closed at one end by a base (which is welded, glued or screwed on) and closed at the other end by a cover (which is generally screwed on or assembled by means of a flange). The cover is pierced by an inlet orifice which allows air to be admitted, whereas the base is pierced by an outlet orifice which permits collection of the nitrogen-enriched gas at the outlet of the system. Another outlet is provided for the separated gas (oxygen). The cylindrical envelope can for example be provided with an orifice which is perpendicular to the axis of the cylinder, thus permitting discharge of the oxygen filtered by the system.

The geometry of the inlet and outlet orifices can have different natures and shapes.

The filtration element which is disposed inside the casing is generally constituted by a bundle of hollow polymer fibers which are present in a very large number. The longitudinal axis of the fibers is aligned with the longitudinal axis of the cylinder of the casing.

At the ends of these fibers it is possible to provide a thermosetting material, ideally epoxy, which is cast and re-machined. These rigid material ends permit mechanical retention of the fibers, and cooperation with an O-ring seal(s) system in order to maintain the sealing between the different chambers of the system.

Document U.S. Pat. No. 7,717,983B2 describes a unit for axial retention of the bundle consisting of cones which are centered on both sides in hollow cylinders present on both sides of the outer faces of the membranes.

However, this arrangement generates rigidity of the assembly of the device, and gives rise to detrimental stresses in the membranes during certain operating phases of the system.

SUMMARY OF THE INVENTION

An objective of the present invention is to eliminate some or all of the aforementioned disadvantages of the prior art.

For this purpose, the device according to the invention, which is moreover in conformity with the generic definition provided in the preceding preamble, is substantially characterized in that the retention unit comprises at least one spring unit arranged inside the casing, said spring unit being compressed between a stop formed by the casing and a longitudinal end of the bundle of fibers, in order to ensure the longitudinal retention of the bundle of fibers, whilst permitting its expansion or contraction.

A device of this type permits simple assembly and retention of the membrane bundle.

In addition, according to this arrangement, the expansions and contractions of the membranes are permitted during the phases of functioning and storage of the system (temperature varying for example between −50° C. and 70° C.).

In addition, embodiments of the invention can comprise one or more of the following characteristics:

- the retention unit comprises at least one spring such as a resilient washer;
- the retention unit comprises a resilient washer of the wavy washer type;
- the retention unit comprises a plurality of resilient washers;
- the retention unit comprises a plurality of resilient washers (6) which are stacked on the same side of the casing, between a stop formed by the casing and a longitudinal end of the bundle of fibers;
- the retention unit comprises a plurality of resilient washers, two of which washers are arranged respectively at two ends of the casing, i.e. at least a first resilient washer is arranged between a first stop formed by the casing and a first longitudinal end of the bundle of fibers, whereas at least a second resilient washer is arranged between a second stop formed by the casing and a second longitudinal end of the bundle of fibers;
- the retention unit comprises a flat support washer which is associated with the at least one resilient washer, said flat support washer being arranged between a resilient washer and an end of the bundle of fibers, i.e. the support washer is in contact with an end of the bundle of fibers;
- the at least one resilient washer is in contact with a flat support washer;
- the casing comprises two ends which are assembled to one another and form respectively a base and a cover of the casing;
- the device comprises a cylindrical central sleeve which is arranged in the casing around the bundle of fibers.

In addition, when the ends of the membranes are integral with rigid (epoxy or other) ends, an arrangement of this type limits the shearing forces on these rigid ends (epoxy only and fibers embedded in the epoxy).

The invention also relates to an inerting device for an aircraft tank, comprising a separation device according to any one of the preceding or following characteristics, in which the bundle of hollow fibers is of the type with selective adsorption of the oxygen.

The invention also relates to an aircraft comprising an inerting device of this type.

The invention can also relate to any alternative device or process comprising any combination of the preceding or following characteristics.

BRIEF DESCRIPTION OF THE FIGURES

Other particular features and advantages will become apparent from reading the following description, provided with reference to the figures, in which:

FIG. 1 represents a schematic partial view in cross section illustrating a first embodiment of a separation device according to the invention;

FIG. 2 illustrates a front view in half cross section of an example of a resilient unit or spring which can be used in the separation device according to the invention;

FIG. 3 represents a partial schematic view in cross section of an end of a separation device according to another embodiment of the invention;

FIG. 4 represents a view in perspective of a cross section of an example of a retention unit for the device in FIG. 3.

FIG. 5 illustrates an aircraft including an OBIGGS device including the separation device according to the invention.

DETAILED DESCRIPTION OF THE INVENTION

The air separation device represented in FIG. 1 comprises a casing 1, 2 with a generally cylindrical form which accommodates a filtration element comprising a bundle of hollow oblong fibers 3 forming a membrane. For example, these membranes are those marketed by the company "MEDAL".

As illustrated in FIG. 1, the casing can be formed by two ends 1, 2 which are assembled to one another and form respectively a base and a cover of the cylindrical casing.

One or both ends 1, 2 can delimit the cylindrical central part of the casing. In addition, a cylindrical central core 7 (which for example is made of metal) can be provided. This cylindrical central core 7 can be connected to at least one of the two ends 1, 2. The central longitudinal axis of the cylinder is represented in FIG. 1.

The longitudinal axis of the bundle of fibers 3 is parallel to the longitudinal axis of the cylindrical casing 1, 2 (i.e. parallel to the generatrices of the cylindrical part). Conventionally, at one end, the casing 1, 2 comprises an air inlet orifice 4, and, at a second end, a purified (nitrogen-enriched) gas outlet 5. For the purpose of simplification, the filtered gas (oxygen) discharge orifice is not represented in the figures.

According to an advantageous feature, the device comprises a unit for longitudinal retention of the bundle of fibers 3 in the casing 1, 2, constituted by a spring such as a resilient washer 6. The resilient washer 6 is arranged inside the casing 1, 2 and is compressed between a stop 12 formed by the casing 1, 2 and an end of the bundle of fibers 3. By this means, the washer 6 ensures resilient axial retention of the bundle of fibers 3 in the casing 1, 2. In other words, the resilient washer 6 permits expansion or contraction of the bundle of fibers 3 in the casing (according in particular to the temperature of use. The outer diameter of the resilient washer 6 preferably corresponds to the inner diameter of the casing 1, 2).

The resilient washer 6 thus makes it possible to absorb the axial compression forces, whilst allowing the cylinder of fibers to expand and contract freely, longitudinally, according to the development of the temperature.

The resilient washer 6 is preferably a wavy resilient washer as represented in FIG. 2. One face of the ring formed by the resilient washer 6 is supported in the casing (or an element secured in the casing), whereas the other face of the washer 6 is supported on an end of the bundle of fibers 3.

It will be appreciated that any other type of resilient unit such as a washer or spring can be envisaged, for example a (metal or other) compression spring forming a plurality of lobes which undulate according to a transverse cross section. For example the spring unit can comprise a wavy washer which is marketed by the company BORELLY and in particular a washer designated by the trade mark ONDUL-FIL®.

In the case when the end of the bundle of fibers 3 is embedded in a rigid thermosetting material, the resilient washer 6 transmits forces to the fibers, without giving rise to shearing of this rigid part.

In addition, the resilient washer 6 does not affect the surface of exchange of the gases between the bundle of fibers 3 and the remainder of the cylinder.

The opposite longitudinal ends of the bundle of fibers 3 can each comprise a hollow area which is designed for the centering (these hollow areas are optional and unused in this example).

The washer 6 can be used alone (as illustrated in FIG. 1), or it can be associated with a flat support washer 16 (which is not wavy, and therefore not resilient). For example, the flat support washer 16 can be arranged in contact with the bundle of fibers 3, whereas the wavy washer 6 is arranged between a stop of the casing 1, 2 and the flat support washer 16.

The support washer 16 makes it possible to distribute the force applied to the bundle of fibers 3 better than the wavy washer 6 (unlike a flat washer 16, a resilient washer 6 is in contact with the bundle of fibers 3 only discontinuously).

In a possible variant, a resilient washer 6 (alone or associated with a support washer 16) can also be arranged in the same manner at the other end of the bundle of fibers 3. In other words, the resilient retention is formed on both sides of the bundle of fibers 3.

In addition, as illustrated in FIG. 4, the retention unit can be constituted by a plurality of stacked resilient washers 6 (for example two or three washers or more).

The number of resilient washers 6 used can be selected according to the level of expansion of the bundle of fibers 3, and the precision of machining of the various parts.

Thus, if a plurality of resilient washers 6 are necessary, they can be positioned on the same side of the bundle 3 in order to thrust the bundle of fibers 3 to the base of the casing 1, 2. In this case, the variation of dimension during the expansion of the membrane will take place entirely on the side where the resilient washers 6 are present (with a decrease in the volume of the chamber). On the contrary, this variation of volume will be distributed equally on both sides of the bundle 3 when the resilient washers 6 are provided on both sides of the bundle of fibers 3.

The resilient washers 6 can be positioned entirely on the cover 2 side, i.e. on the inlet side. Since the pressure is generally greater on the gas inlet side, this arrangement has the advantage of making the spring or the washers work only to compensate for the dimensional variations caused by the thermal expansions or contractions.

FIG. 3 illustrates a separation device in which the retention unit comprises two pairs of stacked washers at an end of the bundle of fibers 3, each pair of washers comprising a resilient washer 6 and a flat retention washer 16. The support washer 16 for one of the pairs of washers 6, 16 is supported on the end of the bundle of fibers 3, on the end impregnated with the rigid material (represented spotted with dots in FIG. 3). As illustrated in FIG. 3, the periphery of the bundle of fibers 3 impregnated with the rigid material 8 can comprise an outer layer 88 of "pure" rigid material (i.e. without the fibers of the membrane). This layer 88 of pure rigid material can be designed to accommodate at least one seal 14 for sealing with the casing 1, 2 (for example an O-ring seal). In addition, in order not to obstruct part of the active surface, the washer(s) 6, 16 is/are preferably supported on this layer 88 of pure rigid material (and not on the layer of rigid material mixed with the fibers).

In the non-limiting example represented in FIG. 3, the bundle of fibers 3 comprises a central tube 12 (which for example is made of aluminum), the end of which is closed by a stopper 13 (which for example is screwed into the tube 12).

The above-described solution(s) permit(s) symmetrical machining of the rigid parts of the device, and therefore undifferentiated fitting in one direction or the other. In addition, the number of parts used in the fitting is relatively limited, and makes possible a reliable system.

In addition, the solutions described allow the assembly of the fibers (membrane) to expand and contract freely, by limiting or reducing the lever arm which is applied to the epoxy ends of the membrane, in comparison with the solutions where the retention force is applied to the central part.

As illustrated in FIG. 5, the device 11 can be used in a system ("OBBIGS") for inerting the tank 10 of an aircraft.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising."

"Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An inerting device for an aircraft tank comprising an air separation device, said air separation device comprising:
    a casing having a generally cylindrical form and a longitudinal axis and having an air inlet orifice and a purified gas outlet orifice at first and second ends thereof, respectively;
    a filtration element enclosed within said casing, said filtration element comprising a bundle of hollow oblong fibers forming a membrane, a longitudinal axis of the fibers being parallel to said longitudinal axis of said cylindrical casing, said bundle having, at one or both ends thereof, a rigid layer of a material;
    a first retention unit supported on said rigid layer and being adapted and configured to retain said bundle of fibers in said casing, said first retention unit comprising at least one spring unit arranged inside said casing, each of said at least one spring unit of said first retention unit being compressed between a first longitudinal end of the bundle of fibers and a first stop that is formed by said casing so as to permit expansion or contraction of said bundle of fibers.

2. The device of claim 1, wherein said at least one spring unit of said first retention unit comprises at least one resilient washer.

3. The device of claim 2, wherein said at least one spring unit of said first retention unit further comprises a flat support washer that is arranged between, said at least one resilient washer of said first retention unit and the first longitudinal end of the bundle of fibers.

4. The device of claim 3, wherein said flat support washer is in contact with said at least one resilient washer of said first retention unit.

5. The device of claim 2, wherein said at least one spring unit of said first retention unit comprises a plurality of said resilient washers.

6. The device of claim 1, wherein said at least one spring unit of said first retention unit comprises at least one wavy resilient washer.

7. The device of claim 6, wherein said at least one wavy resilient washer comprises a plurality of wavy resilient washers and each of said plurality of wavy resilient washers of said first retention unit is stacked on a same side of said casing.

8. The device of claim 1, further comprising a second retention unit comprising at least one spring unit, said at least one spring unit of said second retention unit comprises at least one resilient washer, wherein:
    said bundle has a second longitudinal end opposite said first longitudinal end; and
    said at least one resilient washer of said at least one spring unit of said second retention unit being arranged between a second stop formed by said casing and said second longitudinal end of said bundle of fibers.

9. The device of claim 1, wherein said casing comprises two ends which are assembled to one another and form, respectively, a base and a cover of said casing.

10. The device of claim 9, further comprising a cylindrical central sleeve arranged in said casing around said bundle of fibers.

11. The device of claim 1, wherein said material of said rigid layer is a thermosetting material.

12. An aircraft comprising said inerting device of claim 1.

* * * * *